US009967231B2

(12) United States Patent
Shetty et al.

(10) Patent No.: US 9,967,231 B2
(45) Date of Patent: May 8, 2018

(54) INTER-POD TRAFFIC REDIRECTION AND HANDLING IN A MULTI-POD NETWORK ENVIRONMENT

(71) Applicant: CISCO TECHNOLOGY, INC., San Jose, CA (US)

(72) Inventors: Nikhil Gopinath Shetty, Milpitas, CA (US); Siva Gaggara, Sunnyvale, CA (US); Ravindra Nandalal Rathi, Cupertino, CA (US); Jialin Song, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 128 days.

(21) Appl. No.: 14/662,006

(22) Filed: Mar. 18, 2015

(65) Prior Publication Data

US 2016/0277355 A1    Sep. 22, 2016

(51) Int. Cl.
*H04L 29/12* (2006.01)
*H04L 12/935* (2013.01)
*H04L 12/741* (2013.01)
*H04L 12/721* (2013.01)
*H04L 12/46* (2006.01)

(52) U.S. Cl.
CPC ...... *H04L 61/2592* (2013.01); *H04L 12/4633* (2013.01); *H04L 45/72* (2013.01); *H04L 45/745* (2013.01); *H04L 49/3009* (2013.01); *H04L 61/2514* (2013.01)

(58) Field of Classification Search
None
See application file for complete search history.

(56) References Cited

U.S. PATENT DOCUMENTS

| | | | | |
|---|---|---|---|---|
| 5,809,021 | A * | 9/1998 | Diaz | H04J 3/1611 370/364 |
| 8,483,096 | B2 * | 7/2013 | Vandat | H04L 45/00 370/256 |
| 9,237,124 | B2 * | 1/2016 | Arad | G06F 9/45558 |
| 9,331,936 | B2 * | 5/2016 | Ayoub | H04L 45/64 |
| 9,356,866 | B1 * | 5/2016 | Sivaramakrishnan | H04L 45/7453 |
| 2012/0226789 | A1 * | 9/2012 | Ganesan | G06F 9/5061 709/223 |
| 2012/0226799 | A1 * | 9/2012 | Kapur | G06F 9/5044 709/224 |
| 2013/0016723 | A1 * | 1/2013 | Arad | G06F 9/45558 370/392 |
| 2013/0044631 | A1 * | 2/2013 | Biswas | H04L 67/2804 370/254 |
| 2013/0148661 | A1 * | 6/2013 | McCanne | H04L 12/1836 370/390 |

(Continued)

*Primary Examiner* — Suk Jin Kang
(74) *Attorney, Agent, or Firm* — Polsinelli PC

(57) ABSTRACT

An example method for to inter-pod traffic redirection and handling in a multi-pod network environment is provided and includes receiving a packet with an overlay header outgoing from a first pod, identifying the packet as redirected based on a source address in the overlay header indicating a second pod and a destination address in the overlay header indicating a third pod, the first pod being distinct from the second pod and the third pod, setting a redirection bit in the overlay header tagging the packet as redirected, and transmitting the packet to the third pod.

19 Claims, 7 Drawing Sheets

(56) References Cited

U.S. PATENT DOCUMENTS

| | | | |
|---|---|---|---|
| 2013/0163594 A1* | 6/2013 | Sharma | H04L 45/64 370/392 |
| 2013/0287022 A1* | 10/2013 | Banavalikar | H04L 45/00 370/389 |
| 2013/0287036 A1* | 10/2013 | Banavalikar | H04L 45/00 370/401 |
| 2014/0016501 A1* | 1/2014 | Kamath | H04L 69/22 370/253 |
| 2014/0096183 A1* | 4/2014 | Jain | H04L 12/4641 726/1 |
| 2014/0112349 A1* | 4/2014 | Moreno | H04L 45/64 370/400 |
| 2014/0201733 A1* | 7/2014 | Benny | G06F 9/455 718/1 |
| 2014/0207968 A1* | 7/2014 | Kumar | H04L 45/38 709/244 |
| 2014/0233569 A1* | 8/2014 | Yong | H04L 45/64 370/392 |
| 2014/0269705 A1* | 9/2014 | DeCusatis | H04L 45/52 370/390 |
| 2014/0280836 A1* | 9/2014 | Kumar | H04L 49/70 709/223 |
| 2014/0280884 A1* | 9/2014 | Searle | H04L 43/0864 709/224 |
| 2015/0188773 A1* | 7/2015 | DeCusatis | G06F 9/45558 370/254 |
| 2015/0195197 A1* | 7/2015 | Yong | H04L 45/74 370/392 |
| 2015/0195343 A1* | 7/2015 | Barabash | H04L 67/10 709/204 |
| 2015/0200848 A1* | 7/2015 | Janakiraman | H04L 12/4633 370/392 |
| 2015/0288787 A1* | 10/2015 | Banavalikar | H04L 45/00 370/392 |
| 2015/0295819 A1* | 10/2015 | Kamath | H04L 69/22 370/392 |
| 2016/0006769 A1* | 1/2016 | Jain | H04L 12/4641 726/1 |
| 2016/0036697 A1* | 2/2016 | DeCusatis | H04L 45/52 370/392 |
| 2016/0087867 A1* | 3/2016 | Kamble | H04L 12/4633 370/253 |
| 2016/0112313 A1* | 4/2016 | Niu | H04L 45/00 370/392 |
| 2016/0226753 A1* | 8/2016 | Young | H04L 45/48 |
| 2016/0323121 A1* | 11/2016 | Benny | H04L 45/64 |

\* cited by examiner

INTER-POD TRAFFIC REDIRECTION AND HANDLING IN A MULTI-POD NETWORK ENVIRONMENT

TECHNICAL FIELD

This disclosure relates in general to the field of communications and, more particularly, to inter-pod traffic redirection and handling in a multi-pod network environment.

BACKGROUND

Data centers are increasingly used by enterprises for effective collaboration and interaction and to store data and resources. A typical data center network contains myriad network elements, including endpoints, load balancers, routers, switches, etc. The network connecting the network elements provides secure user access to data center services and an infrastructure for deployment, interconnection, and aggregation of shared resource as required, including applications, endpoints, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for inter-pod traffic redirection and handling in a multi-pod network environment is provided and includes receiving a packet with an overlay header outgoing from a first pod, identifying the packet as redirected based on a source address in the overlay header indicating a second pod and a destination address in the overlay header indicating a third pod, the first pod being distinct from the second pod and the third pod, setting a redirection bit in the overlay header tagging the packet as redirected, and transmitting the packet to the third pod.

As used herein, a "pod" (also called a "point of delivery") refers to a deployable module (e.g., collection, portion, group, sub-system, etc.) of network, compute, storage, and application components (e.g., resources) that work together to deliver networking services. Each pod is under a common administrative control, with separate pods being controllable separately and independently. In some embodiments, the pods comprise repeatable patterns of resources facilitating increase in modularity, scalability and manageability of large networks, such as data centers.

Example Embodiments

Figure 1:
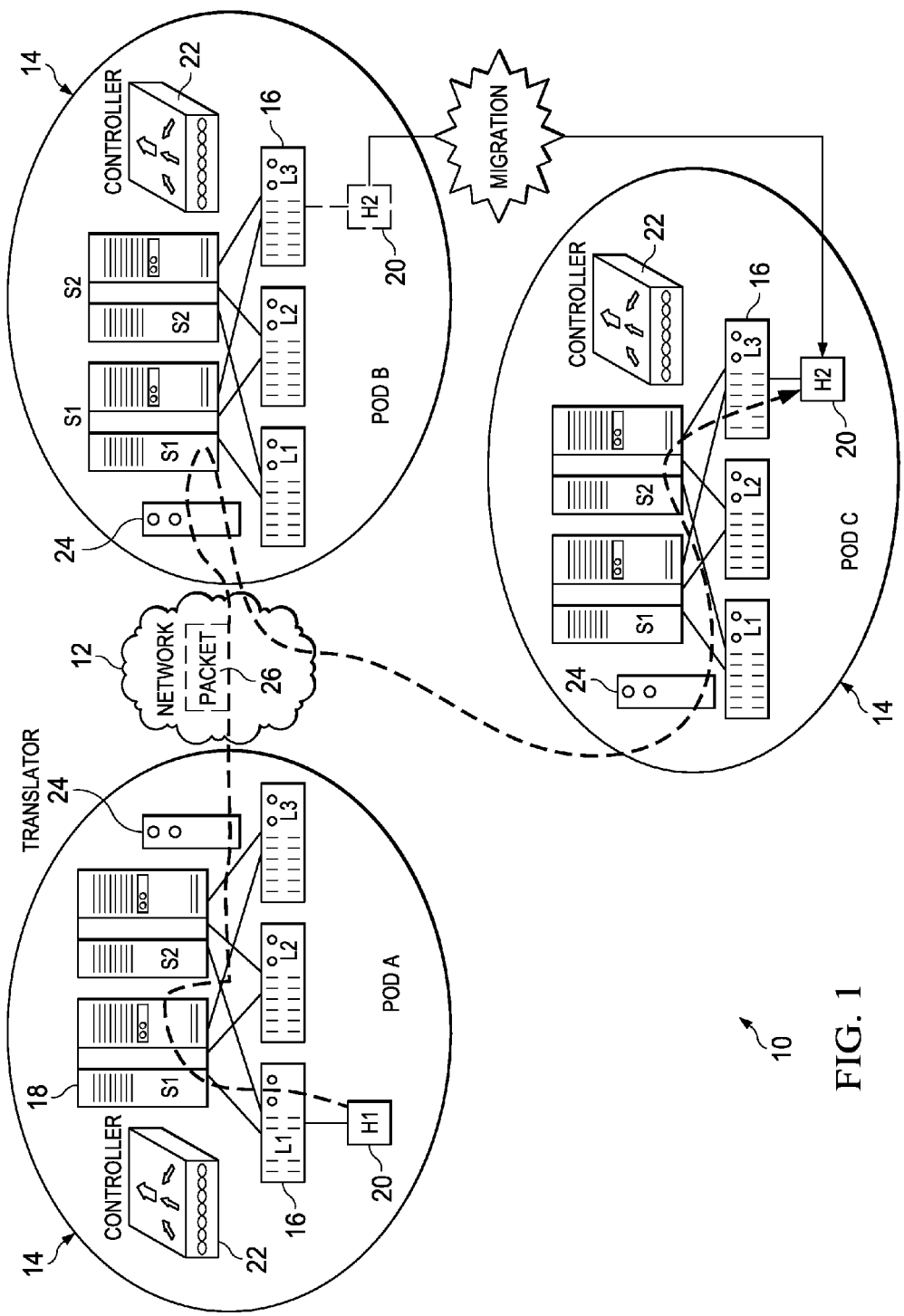
FIG. 1 is a simplified block diagram illustrating a communication system that facilitates inter-pod traffic redirection and handling in a multi-pod network environment.

Turning to FIG. 1, FIG. 1 is a simplified block diagram illustrating a communication system 10 to facilitate inter-pod traffic redirection and handling in a multi-pod network environment. FIG. 1 illustrates a multi-pod network 12 connecting a plurality of pods 14 (e.g., pod A, pod B, pod C). Each pod 14 includes a fabric (e.g., network topology wherein nodes interconnect via switches) comprising a plurality of leaf switches 16 (e.g., L1, L2, L3) interconnected to spine switches 18 (e.g., S1, S2). Leaf switches 16 and spine switches 18 may be similar in a variety of ways; they are dissimilar in the devices to which they connect; whereas leaf switches 16 connect to endpoints 20 (e.g. H1) and to spine switches 18, spine switches 18 are connected only to leaf switches 16. Endpoints 20 can comprise virtual or physical machines executing in network 12. For example, endpoints 20 may comprise application servers, database servers, client devices, etc.

Each pod 14 is a under a common administrative control, for example, controlled by one or more controllers 22 establishing a common administrative zone. Thus, each pod 14 may be controlled by respective controller(s) 22 with separate network and other configurations. Each pod 14 conforms to a standard operating footprint that shares the same failure domain; in other words, if something catastrophic happens in any one pod 14 (e.g., pod A), workloads running in that pod 14 are affected but neighboring workloads in a different pod 14 (e.g., pod B, pod C) are not affected. Note that each pod 14 can comprise a separate network distinct physically and/or logically from other pods 14 in network 12. For example, pod A and pod B may be located in two separate floors of a building in San Jose, whereas pod C may be located in New York.

Each pod 14 includes a translator 24 at its border; translator 24 receives incoming and outgoing traffic and redirects inter-pod traffic according to pre-configured rules and policies. In many embodiments, translator 24 may perform network address translation (NAT) and comprises one or more active units placed in traffic data path, for example, as a functional component of a border router or site gateway. Translator 24 intercepts Internet Protocol (IP) packets, and may forward each packet onward with or without alteration to the contents of the packet, or may elect to discard the packet. Translator 24 may differ from a conventional router or a firewall due to its discretional ability to alter the IP packet before forwarding it on. Further, translator 24 may be similar to a firewall, and different from a router, in its topological sensitivity: translator 24 has an "inside" (e.g., side facing into pod 14) and an "outside," (e.g., side facing away from pod 14) and undertakes different operations on intercepted packets depending on whether the packet is going from inside to outside, or in the opposite direction.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A network provider may build a network infrastructure (e.g., large data centers) to support cloud computing using multiple pods for fault tolerance. For example, an initial number of pods may be deployed to support expected demand. The pods, plus the aggregation and core, make up the initial cloud infrastructure. The network infrastructure is modeled in the service inventory so that tenant services can be provisioned and activated by a process known as on-boarding. The architecture and contents of the pod is generally determined by the individual network provider. Some providers use a pod comprised of an integrated compute stack that offers a pre-integrated set of compute, network, and storage equipment that operates as a single solution and is easier to buy and manage, offering capital expenditure and operational expenditure savings.

However, with multi-pod networks, traffic between the pods may get misdirected to the wrong pod for various reasons, such as presence of same bridge domain on multiple pods, move of an endpoint, etc. Thus, packets may have to be redirected to a different pod to complete the flow. In a general sense, traffic redirection is possible at the application level. For example, DNS redirect, HTTP redirect, etc. can serve to redirect traffic at the application level. However, application-level redirection may not be feasible, possible, or effective in certain situations such as in endpoint migration from one pod to another.

Typically, a virtualized data center architecture (e.g., with multi-pods) implements an overlay network over an underlay infrastructure. Nodes in the overlay network can be considered as being connected by virtual or logical links, each of which corresponds to a path (e.g., through multiple physical links) in the underlying network. Multiple overlay networks can be implemented over any network infrastructure and the underlay is used to carry the traffic to appropriate endpoints in the overlay network. The overlay network uses some form of encapsulation (e.g., indirection) to decouple a network service from the underlying infrastructure. Per-service state is restricted at the edge of the network and the underlying physical infrastructure of the core network has no or little visibility of the actual services offered. Such a layering approach enables the core network to scale and evolve independently of the offered services. In a general sense, such overly networks use protocols like Virtual Extensible Local Area Network (VXLAN), Stateless Transport Tunneling (STT), Network Virtualization using Generic Routing Encapsulation (NVGRE) or network virtualization overlays (NVO3) and run traffic between virtual switches.

The underlay infrastructure implements the overlay by using an additional encapsulation over the overlay network's packets. Any endpoint lookup for an unknown endpoint is performed in an endpoint repository and the endpoint repository is kept updated. The source endpoint, or the hypervisor of the source endpoint, or a switch in the middle of the traffic flow can learn the underlay location of the destination endpoint from the data path when the reverse packets reach the source endpoint because the underlay header encapsulation contains the destination endpoint's underlay source location. For performance reasons, it is possible that the source endpoints cache the location of the destination endpoint and avoid going to the endpoint repository for every packet.

Assume, for the sake of discussion, that endpoint H2 migrates from pod B to another pod C in the same bridge domain of multi-pod network 12 (e.g., which could implement one or more overlay networks). When endpoint H2 migrates, though pod controller 22 at pod B may be informed about the new location of endpoint H2, substantially all the intermediate nodes and source endpoints (e.g., H1) may not be so updated, or cannot be updated, or it may take a long time to notify all of them of the new location of endpoint H2 in network 12. In the meantime, traffic may continue to flow to endpoint H1 at the previous location of endpoint H2 at pod B and may be dropped at pod B there because endpoint H2 is not to be found in pod B.

To explain using an example, assume that migrating endpoint H2 was engaged in a communication session with endpoint H1 in pod A. For example, endpoint H1 at pod A sends out a packet 26 to endpoint H2. Packet 26 includes a header, corresponding to the underlay, which lays out the source and destination IP addresses of endpoints H1 and H2. Packet 26 is first received at switch L1. Switch L1 assumes (e.g., from data in proxy modules of spine switches 18) that endpoint H2 is located at pod B because endpoint H2's migration has not yet been communicated to pod A. Switch L1 adds an overlay header, indicating a source address of switch L1 and a destination address corresponding to pod B.

Translator 24 at pod A receives packet 26 and rewrites the source address to indicate an external tunnel endpoint address (ETEP) of pod A, namely, ETEP A and forwards packet 26 to pod B. In a general sense, the header of an IP packet contains source and destination IP addresses. Translator 24 is configured with a pool of public addresses, and when an "inside" endpoint 20 (such as endpoint H1) first sends an outbound packet (such as packet 26), an address is drawn from this pool and mapped as a temporary alias to the inside endpoint H1's local address. The mapped address is used as the new source address for the outgoing packet, and a local session state is set up in translator 24 for the mapping between the private and the public addresses. After the mapping is made, all subsequent packets within the application stream, from the internal endpoint H1 address to the specified external endpoint H2 address, will also have their source address mapped to the external address in the same fashion. Because packet 26 is being passed in the direction from inside to outside pod A, translator 24 at pod A rewrites the overlay source address in packet 26 to a different value (e.g., to ETEP A from L1).

Note that when a packet is received from outside the pod destined to inside the pod, the destination address is rewritten to a different value. When the incoming packet arrives on the external interface, the destination address is checked. If it is one of the NAT pool addresses, translator 24 looks up its translation table. If it finds a corresponding table entry, the destination address is mapped to the local internal address and the packet is forwarded to its destination within the pod. If there is no current mapping entry for the destination address, the packet is discarded.

Turning back to the example of migrating endpoint H2, according to one embodiment, proxy modules of spine switches 18 in pod B may handle endpoint H2's new location at pod C through a modified bounce mechanism. Packets arriving at pod B and destined to endpoint H2 are bounced or redirected to pod C. Translator 24 at pod B rewrites the source address in the overlay header of packet 26 to the source address of pod B, and forwards the packet to pod C. Note that if the source address is maintained as the pod A address, unicast reverse path forwarding (RPF) checks can fail on the header and packet 26 can get dropped in the intermediate network due to the failing RPF check. However, the pod B source address for redirected packet 26 should not be learnt at pod C as being the source endpoint address. If the pod B address for redirected packet 26 is learnt as being the source endpoint address, further packets of the connection between endpoints H1 and H2 will continue to follow a non-optimized path through from pod C to pod A through pod B.

According to an embodiment of communication system 10, translator 24 at pod B sets a redirection bit in the overlay header of redirected packet 26 tagging packet 26 as redirected. Redirected packet 26 reaches pod C, which rewrites the source and destination addresses to a local pod address and forwards packet 26 to endpoint H2. Directly attached switch L3 inspects the overlay header and determines from the source address in the overlay header that the packet is a redirected packet. The redirection bit causes, through the source address rewrite in the encapsulation (e.g., outer, overlay) header, the destination (e.g., switch L3 in the overlay network at pod C) to determine that the overlay header belongs to a redirected packet so that the destination can avoid learning the source address. The destination of the data flow (in the overlay path, namely, switch L3 at pod C) clears all its information about source endpoint H1 and looks up the local endpoint repository in pod C for the latest location of source endpoint H1. In some embodiments, subsequent data packets may use the correct location of source endpoint H1 and endpoint repository lookup may no longer be required.

For traffic that is redirected from one pod 14 (e.g., pod B) to another pod 14 (e.g., pod C), care has to be taken to ensure that unicast RPF is not broken. In many embodiments, a special bit, namely the redirection bit, is introduced in the overlay header to denote redirected unicast traffic and such traffic is handled differently on the destination pod. In some embodiments, when endpoint 20 (e.g., H2) moves, the control plane can be notified and pod B at the previous location can withdraw subscription to the relevant group (assuming no other receivers at pod B); pod C at the new location can subscribe to the group (assuming that endpoint H2 is the first receiver in pod C). Embodiments of communication system 10 can allow traffic to flow with minimum disruption when endpoint 20 (e.g., H2) moves from one pod 14 (e.g., pod B) to another pod 14 (e.g., pod C). If the inter-pod network has unicast RPF checks, dropping the packet is avoided by using the previous pod IP as an intermediary.

In some example scenarios, host H2 may migrate from pod B to pod A, where host H1 is located. If the data plane in pod A has not changed its cache indicating that host H2 is now located in pod A, a packet from host H1 may be routed out to pod B. In such a scenario, translator 24 at pod B may set the redirection bit (e.g., to 1) and send the packet back to pod A as described herein. The redirection may trigger flushing of the data path, and learning the new location of host H2 within pod A.

Turning to the infrastructure of communication system 10, the network topology can include any number of servers, hardware accelerators, virtual machines, switches (including distributed virtual switches), service nodes, routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Figure 2:
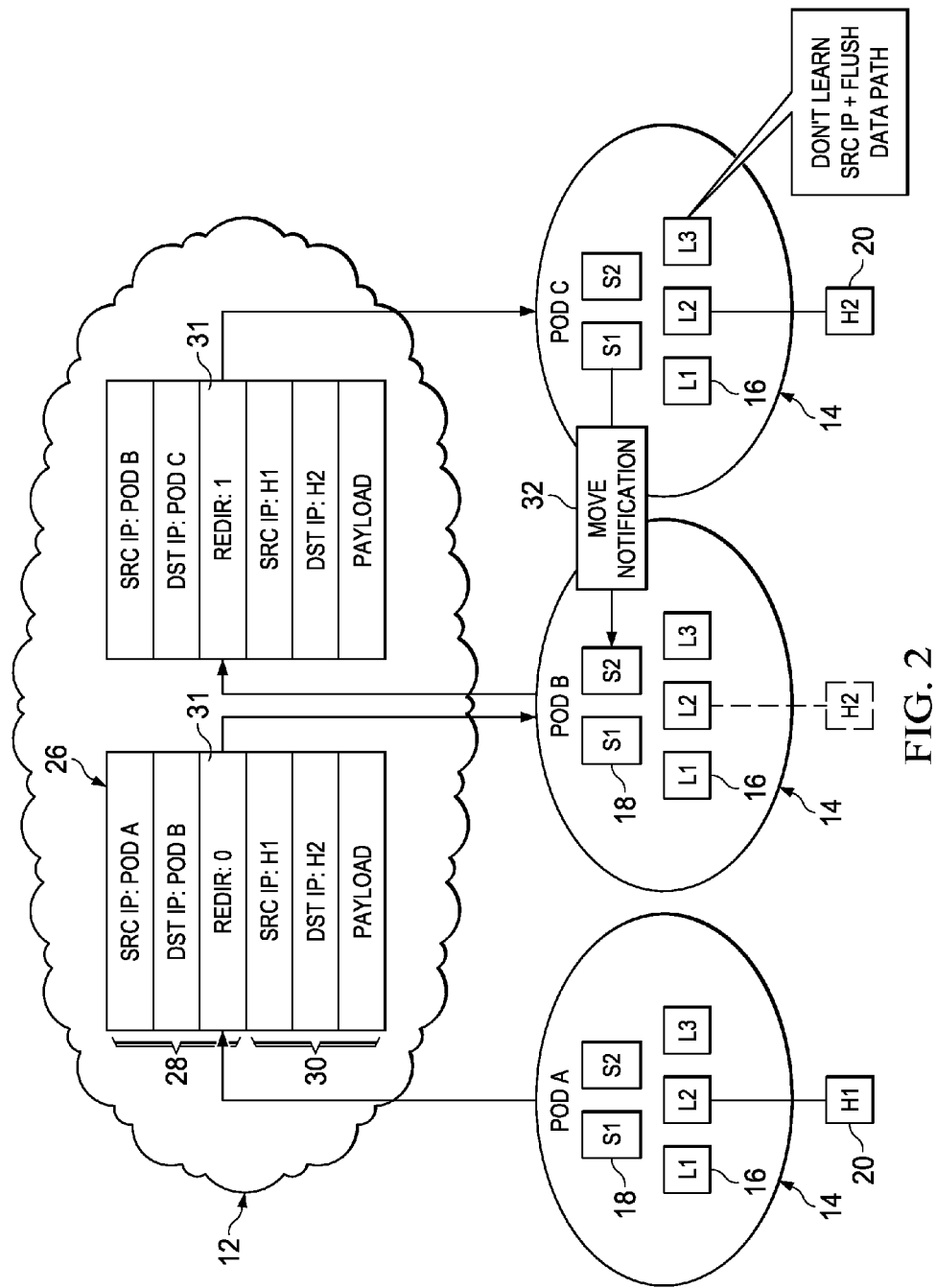
FIG. 2 is a simplified block diagram illustrating example details of embodiments of the communication system.

Turning to FIG. 2, FIG. 2 is a simplified block diagram illustrating example details according to an embodiment of communication system 10. Assume, merely for example purposes that endpoint H2 migrates from pod B to pod C. Assume also that before any move notification reaches endpoint H1, or any updates to the data plane to indicate the changed location of endpoint H2, packet 26 is sent from endpoint H1 to endpoint H2. At switch L2 to which endpoint H1 is directly connected, an overlay header 28 is added to packet 26. Thus, when packet 26 exits pod A, it comprises overlay header 28 and an underlay 30, including the source and destination IP addresses (corresponding to endpoints H1 and H2, respectively) and a payload (e.g., comprising data carried by packet 26).

At packet 26's exit from pod A, the overly header source IP address corresponds to the external address of pod A (e.g., ETEP A) and the overlay header destination IP address corresponds to the external address of pod B (e.g., ETEP B). A redirection bit 31 in overlay header 28 is cleared (e.g., value of zero, not set, reset, etc.), indicating that packet 26 exiting from pod A is not a redirected packet (e.g., it is sourced from endpoint A within pod A). Unlike pod A, pod B knows of the migration of endpoint H2 to pod C because it was the previous location thereof and receives a move notification 32 from pod C.

When packet 26 is received at pod B, the underlay header is inspected and it indicates an endpoint destination of H2, which is not in pod B, and which has moved to pod C. At pod B, overlay header 28 is rewritten to indicate a destination address of pod C. However, unlike typical bounce mechanisms, the source IP is set to pod B's external IP address to avoid unicast RPF check failing in the network. Redirection bit 31 is set (e.g., to value of one) to indicate that packet 26 is a redirected packet.

When packet 26 is received on pod C, redirection bit 31 is checked. If redirection bit 31 is set, pod C data path components (e.g., switch L3 at pod C) can determine that packet 26 is redirected and that it need not learn the location of the source endpoint behind pod B, though pod B is indicated as the source IP address in overlay header 28. Pod C flushes (e.g., deletes, clears, voids, empties, removes, etc.) any data plane cache and uses control plane information (e.g., obtained in proxy modules at spine switches 28) to forward packet 26. Flushing the data path and using the proxy can avoid loops if both source endpoint H1 and destination endpoint H2 move to locations where the endpoint is already learnt on the data path. Merely disabling learning from redirected packets, as is done in regular bounce mechanisms, may not be sufficient.

Figure 3:
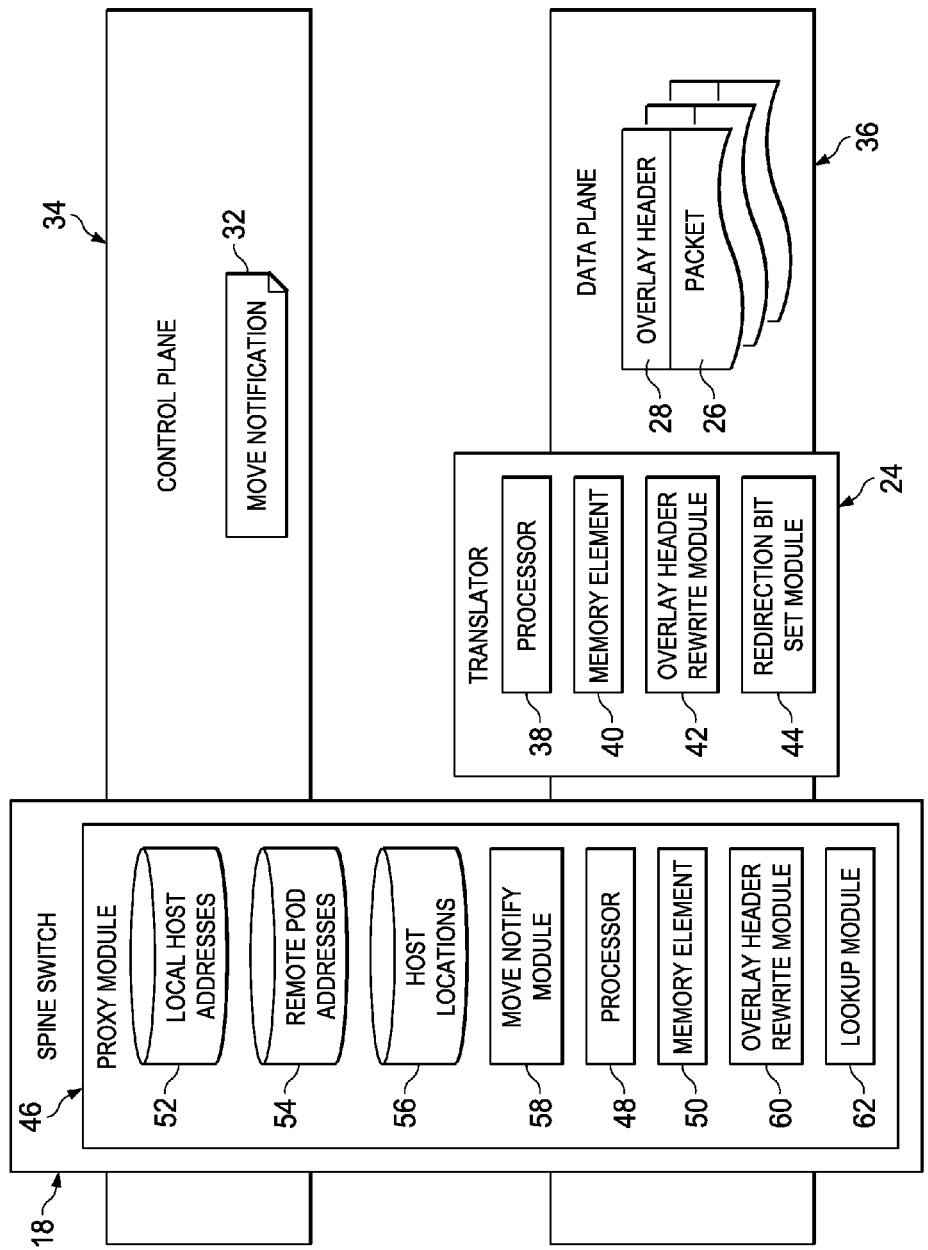
FIG. 3 is a simplified block diagram illustrating other example details of embodiments of the communication system.

Turning to FIG. 3, FIG. 3 is a simplified block diagram illustrating example details according to an embodiment of communication system 10. Traffic in network 12 can flow along two paths: a control plane 34 and a data plane 36. Control notifications may be communicated along control plane 34 using control plane protocols, which may be slower than data plane protocols used in data plane 36. Note that the two separate planes are logically separated through their respective, different protocols.

In a general sense, control plane 34 is a router component that focuses on how a specific router or switch (e.g., spine switch 18) interacts with its peers with state exchange, using specific control plane protocols, such as Border Gateway Protocol (BGP) and Open Shortest Path First (OSPF). The control plane functions typically include system configuration, management, and exchange of routing table information. Packets sent over control plane 34 comprise network device (e.g., spine switch 18) generated or received packets that are used for creation and operation of network 12. Thus, control plane packets can be used to exchange topology information with other routers and construct a routing table based on a routing protocol, for example, Routing Information Protocol (RIP), OSPF, or BGP. Because control functions are not performed on each arriving individual packet, they do not have a strict speed constraint and are implemented in software in general (e.g., using a general purpose or custom processor, such as a router processor). In a general sense, control plane 34 feeds data plane 36 with information required to create data forwarding tables and to update topology changes as they occur.

Data plane 36 (also called forwarding plane) comprises a router component that determines what to do with packets arriving on an inbound interface of the router. Data plane 36 comprises to one or more table(s) in which the router looks up the destination address of the incoming packet and retrieves information necessary to determine the path from the receiving interface, through the internal forwarding fabric of the router, to the proper outgoing interface(s). Typically, data plane 36 is implemented in a high speed Application Specific Integrated Circuit (ASIC), and has the responsibility of parsing packet headers, filtering, encapsulations, queuing, etc. Typically, data plane operations are faster than control plane operations.

According to an embodiment of communication system 10, translator 24 is implemented in data plane 36 (e.g., as a component of the data plane ASIC) and includes a processor 38 and a memory element 40 in addition to an overlay header rewrite module 42 and a redirection bit set module 44. Note that processor 38 and memory element 40 may comprise portions of the same ASIC that implements translator 24, and may be shared between various other components of the ASIC. Translator 24 may receive data packet(s) 26 in data plane 36 and process them appropriately.

Each spine switch 18 in communication system 10 includes a proxy module 46 that can process packets in both control plane 34 and data plane 36. Proxy module 46 includes a processor 48 and a memory element 50, in addition to a local host addresses repository 52, a remote pod addresses repository 54, and a host locations repository 56. Note that local host addresses repository 52, remote pod addresses repository 54, and host locations repository 56 may be combined into a local endpoint repository in some embodiments. In some embodiments, local host addresses repository 52, remote pod addresses repository 54, and host locations repository 56 may be stored as lookup tables, or databases, for example, indexed appropriately using known mechanisms.

Processor 48 can include a general purpose router processor and/or CPU, as well as a portion of a custom ASIC installed in spine switch 18 for data plane operations. Likewise, memory element 50 can include a general memory element in the router processor or CPU, and/or a stand-alone memory, and/or a component of the custom ASIC. A move notify module 58, an overlay header rewrite module 60 and a lookup module 62 may also be included to facilitate various operations.

When some endpoint 20 in network 12 migrates between pods, move notify module 58 in proxy module 46 may receive move notification 32 in control plane 34. Note that move notification 32 may be initially sent from new pod 14 to previous pod 14 of the migration, and later synchronized among substantially all proxy modules in communication system 10 through appropriate control plane messages (e.g., advertisements). Move notify module 58 may also generate and transmit move notification 32 if endpoint 20 migrates to its local pod 14.

Moves (e.g., migrations) of endpoints 20 may trigger an update of local host addresses repository 52 and host locations repository 56. For example, if migrating endpoint 20 was located in local pod 14 of proxy module 46 and moves to another pod 14, local host addresses repository 52 may be updated to delete the IP address of migrating endpoint 20. On the other hand, if migrating endpoint 20 was located in a remote pod and moves to the local pod, local host addresses repository 52 may be updated to add the IP address of migrating endpoint 20. The host addresses repository update may trigger move notify module 58 to generate move notification 32 and transmit it to previous pod 14. Likewise, move notification 32 received from a remote pod may update host locations repository 56 to indicate the migrated endpoint's new pod location.

Irrespective of communication in control plane 34, packets 26 may be communicated in data plane 26. For example, translator 24 receives incoming packet 26 from a remote pod 14 indicating a destination endpoint apparently located in local pod 14. Overlay header rewrite module 42 in translator 24 rewrites the destination address in overlay header 28 of incoming packet 26 to the proxy module's address and forwards packet 26 to proxy module 46 for further processing.

Proxy module 46 receives packet 26, and lookup module 62 may look up local host addresses repository 52 to determine if the destination endpoint indicated in the underlay header is located in local pod 14. If the lookup fails (e.g., destination endpoint address cannot be found in local host addresses repository 52), host locations repository 56 may be looked up to determine the new location of the destination endpoint. Remote pod addresses repository 54 may be looked up and the corresponding remote pod address may be written into the destination address in overlay header 28 of packet 26 by overlay header rewrite module 60 and packet 26 returned to translator 24 in data plane 36.

Translator 24 examines overlay header 28 of outgoing packet 26, and concludes that outgoing packet 26 is a redirected packet because the source address refers to a remote pod 14 (e.g., pod 14 that originated packet 26, and not an endpoint in local pod 14), and the destination address refers to another remote pod 14 (and not local pod 14 of translator 14). Redirection bit set module 44 sets redirection bit 31 in overlay header 28 and forwards packet 26 to the remote pod specified by the destination address.

In another example, translator 24 may receive outgoing packet 26 generated by endpoint 20 in its local pod. Overlay header rewrite module 42 rewrites the source address of overlay header 28 to the local pod address. Redirection bit set module 44 concludes that outgoing packet 26 is not a redirected packet because the source address refers to endpoint 20 in local pod 14, and the destination address refers to remote pod 14. Therefore, redirection bit set module 44 does not set (e.g., clears, resets, etc.) redirection bit 31. Outgoing packet 26 is forwarded out to the destination pod.

Figure 4:
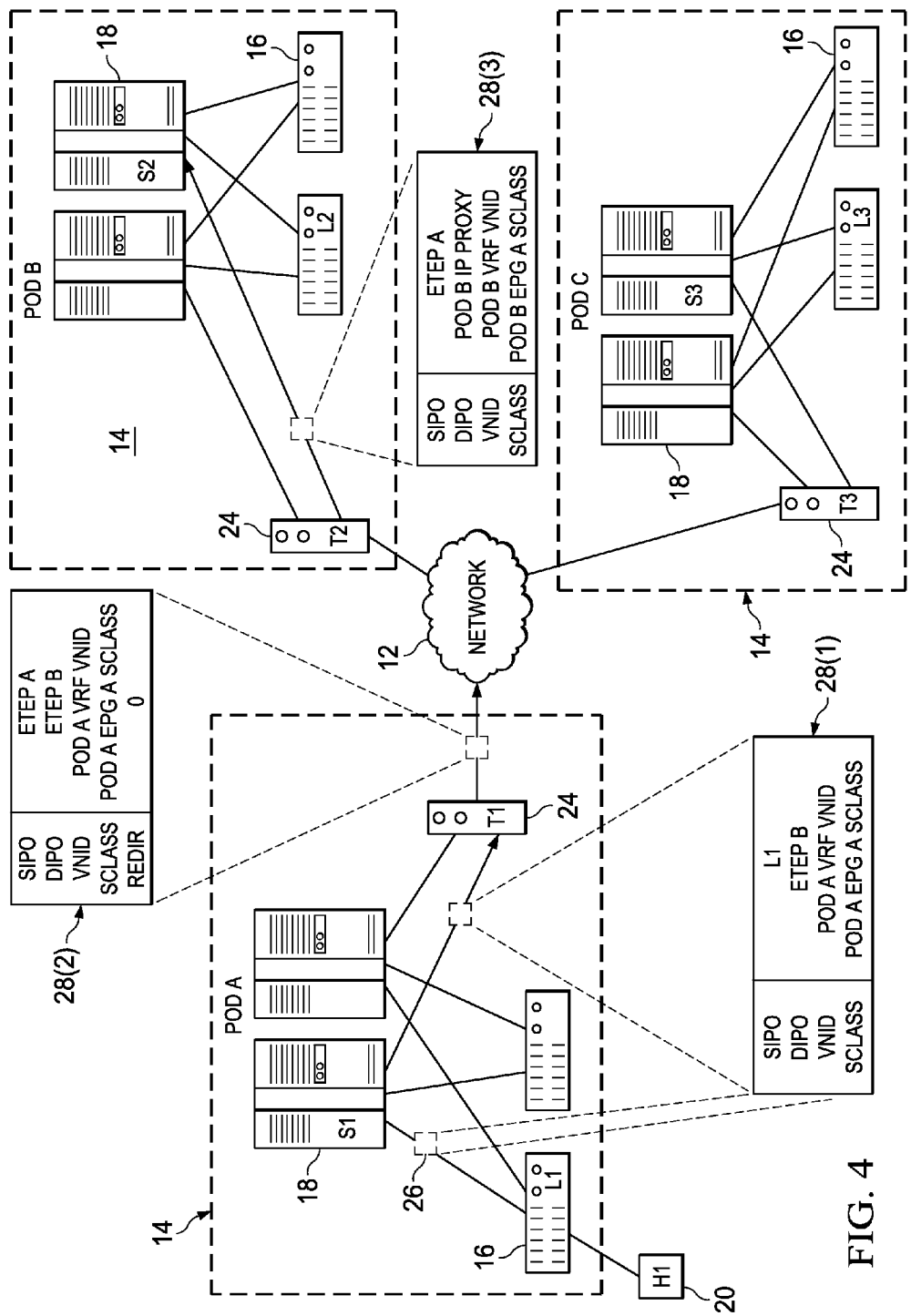
FIG. 4 is a simplified block diagram illustrating yet other example details of embodiments of the communication system.

Turning to FIG. 4, FIG. 4 is a simplified block diagram illustrating example details of an example communication session according to an embodiment of communication system 10. Assume, merely for example purposes that endpoint H1 sends out packet 26 destined to endpoint H2. At L1 in pod A, overlay header 28(1) is inserted to indicate source address of switch L1, destination address (in overlay network 12) of pod B, and quality of service and other parameters (e.g., virtual network identifier (VNID), service class (SCLASS)) of pod A. Spine switch 18 forwards packet 26 to translator T1 in pod A. Translator T1 rewrites overlay header 28(1) to 28(2), rewriting the source address to be the pod A address (ETEP A), and clears redirection bit 31 (e.g., value of 0) indicating that packet 26 is not a redirected packet.

Translator T2 at pod B receives packet 26, and rewrites overlay header 28(2) to 28(3), rewriting the destination address to be the pod B proxy module address (POD B IP PROXY). Translator T2 also deletes redirection bit 31 from overlay header 28(3). Translator T2 also replaces the quality of service and other parameters of overlay header 28(2) with corresponding parameters for pod B. Translator T2 forwards packet 26 to proxy module 46 (not shown) on spine switch S2. Note that any spine switch, not necessarily S2, may be chosen by translator T2 to which to forward packet 26 within the broad scope of the embodiments.

Figure 5:
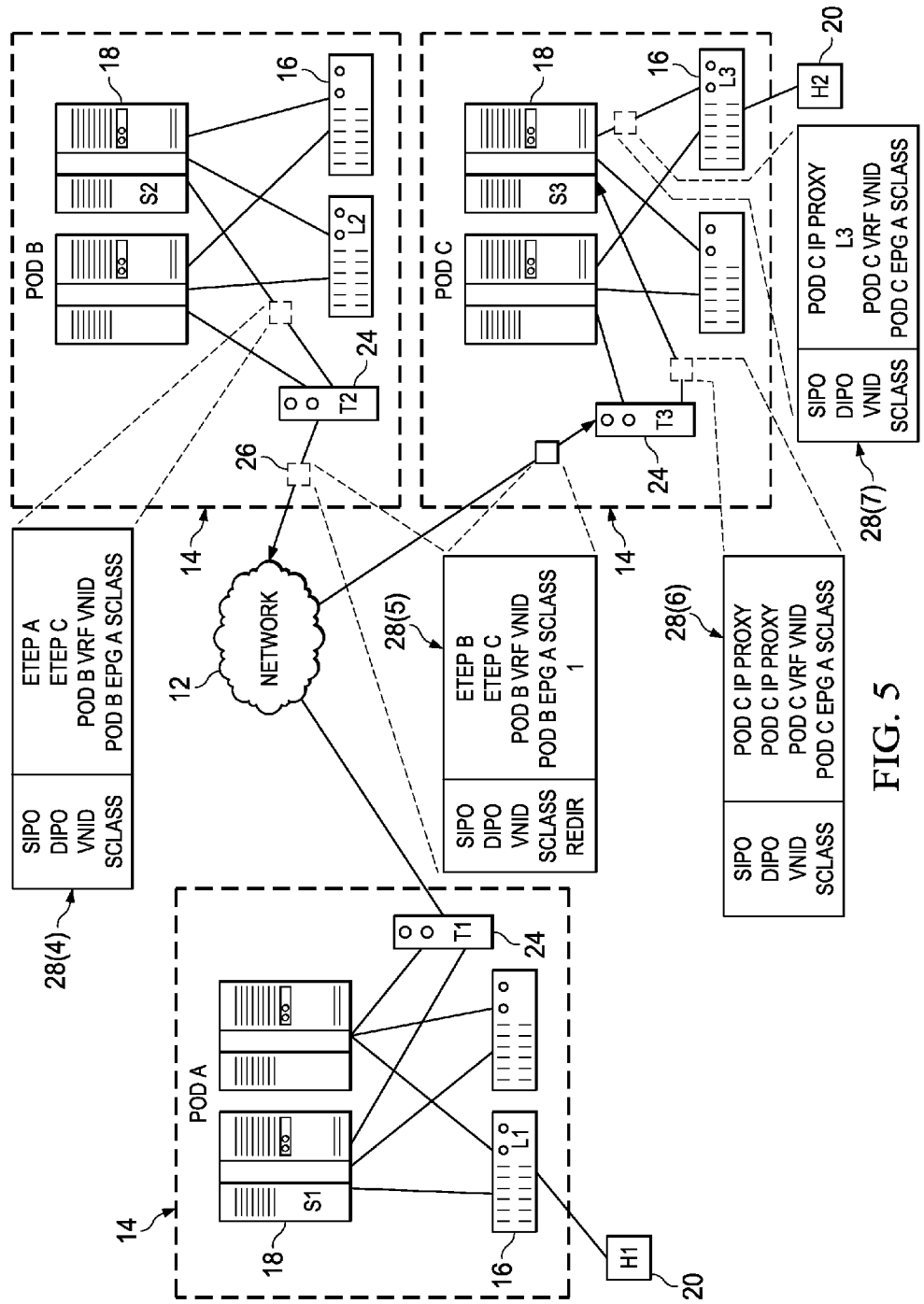
FIG. 5 is a simplified block diagram illustrating yet other example details of embodiments of the communication system.

Turning to FIG. 5, FIG. 5 is a simplified block diagram illustrating further example details of the example communication session of the previous figure according to an embodiment of communication system 10. Proxy module 46 at spine switch S2 examines packet 26, and a lookup of the underlying destination endpoint fails because endpoint H2 has migrated to pod C. Proxy module 46 at spine switch S2 rewrites overlay header 28(3) to 28(4), rewriting the destination address to be the address of pod C (e.g., ETEP C) and bounces packet 26 back to translator T2.

Translator T2 examines overlay header 28(4) and identifies it as a redirect packet because the destination address (ETEP C) corresponds to a remote pod, and the source address (ETEP A) also corresponds to a remote pod. Translator T2 sets redirection bit 31 to 1, indicating that packet 26 is a redirected packet. Translator T2 further rewrites overlay header 28(4) to 28(5), rewriting the source address to be the pod B address (e.g., ETEP B), for example, facilitating successful (e.g., not failing) RPF checks on the packet in network 12. Translator T2 forwards packet 26 to pod C.

Translator T3 at pod C receives packet 26, and determines that it is a redirected packet. Translator T3 rewrites overlay header 28(5) to 28(6), rewriting the source address and the destination address to the pod C proxy address, stripping redirection bit 31, and replacing the quality of service and other parameters to corresponding pod C parameters. Proxy module 46 (not shown) at spine switch S3 receives packet 26, looks up the destination endpoint specified in the underlay header and finds a match. Proxy module 46 at spine switch S3 rewrites overlay header 28(6) to 28(7), rewriting the destination address to that of leaf switch L3 ("destination switch," used herein to refer to the [leaf] switch directly attached to the destination endpoint), and forwards packet 26 to destination switch L3, where overlay header 28(7) is stripped and packet 26 forwarded to endpoint H2.

At destination switch L3, examination of overlay header 28(7) indicates a source of proxy module 46 within pod C, thereby indicating to destination switch L3 that the data path is to be flushed, and the source IP address should not be learnt. Instead, destination switch L3 examines the underlay header, identifies endpoint H1 as the source endpoint, and learns the endpoint H1 location from a control plane query of its local proxy module 46 in pod C. Thus, return packets from endpoint H2 destined to endpoint H1 need not be sent through pod B anymore, as the source location (ETEP A) may be learnt from local proxy module 46 in pod C.

Figure 6:
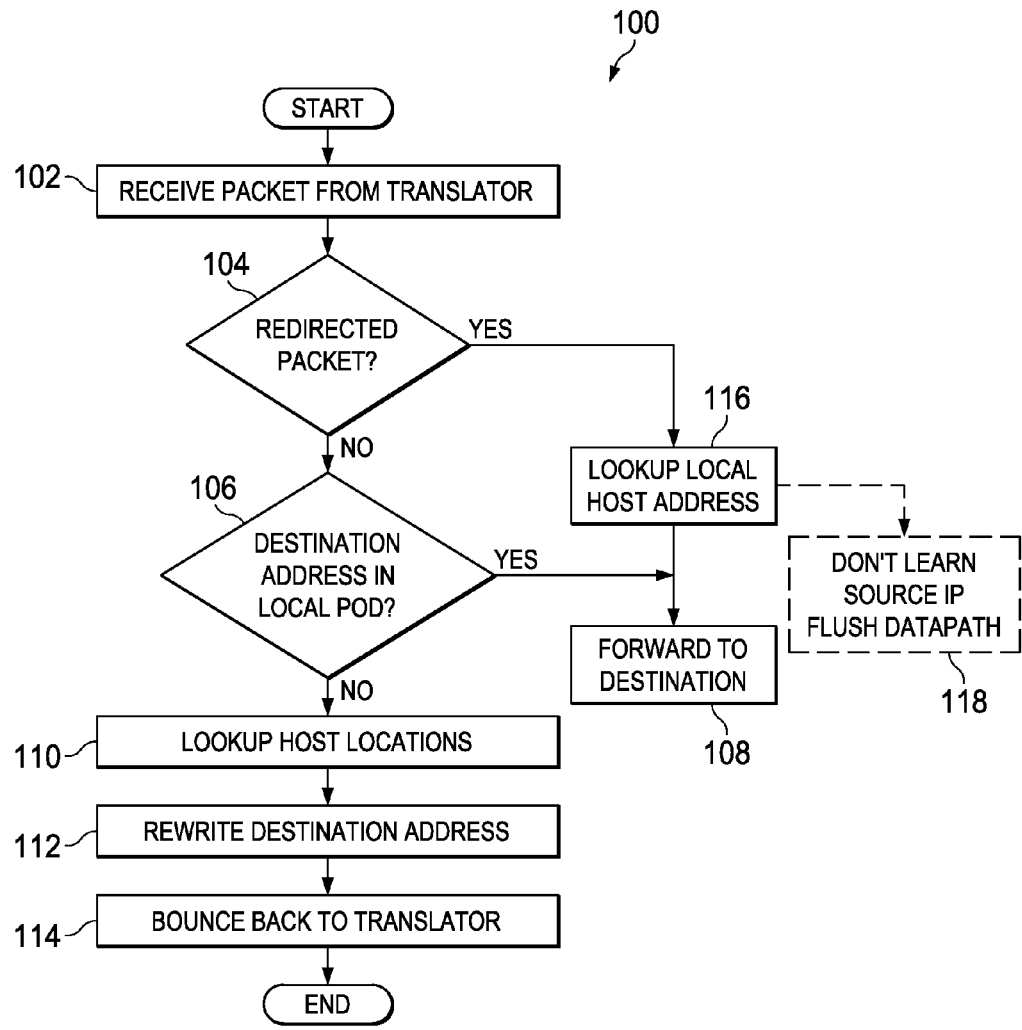
FIG. 6 is a simplified flow diagram illustrating example operations that may be associated with an embodiment of the communication system.

Turning to FIG. 6, FIG. 6 is a simplified flow diagram illustrating example operations 100 that may be associated with proxy module 46 according to an embodiment of communication system 10. At 102, proxy module 46 may make a determination whether packet 26 is a redirected packet. The determination may be made by inspecting the source address in overlay header 28. If the source address in overlay header 28 corresponds to its own address (e.g., proxy module address), packet 26 is a redirected packet. If the source address in overlay header 28 is a remote pod address, or does not correspond to its own address, packet 26 is not a redirected packet.

If packet 26 is not a redirected packet, at 106, a determination may be made whether the destination address in the underlay header of packet 26 is present in its local pod 14. The determination may be made by a lookup of the destination address of the underlay header in its local routing and/or forwarding tables, for example, in local host addresses repository 52. If the destination address is found, at 108, packet 26 may be forwarded to its destination appropriately.

If the destination address is not found, at 110, proxy module 46 may lookup host locations repository 56 and determine the pod address to which the destination endpoint has moved. At 112, proxy module 46 rewrites the destination address in overlay header 28 to the new pod address and at 114, bounces packet 26 back to translator 24.

Turning back to 104, if packet 26 is a redirected packet, at 116, proxy module 46 performs a lookup of local host addresses and forwards packet 26 to its destination. At 118, an instruction is provided to relevant leaf switch (e.g., directly attached to destination endpoint) to not learn the source address and to flush the data path. In some embodiments, the instruction may be provided in the form of a source address that corresponds to the proxy module address.

Figure 7:
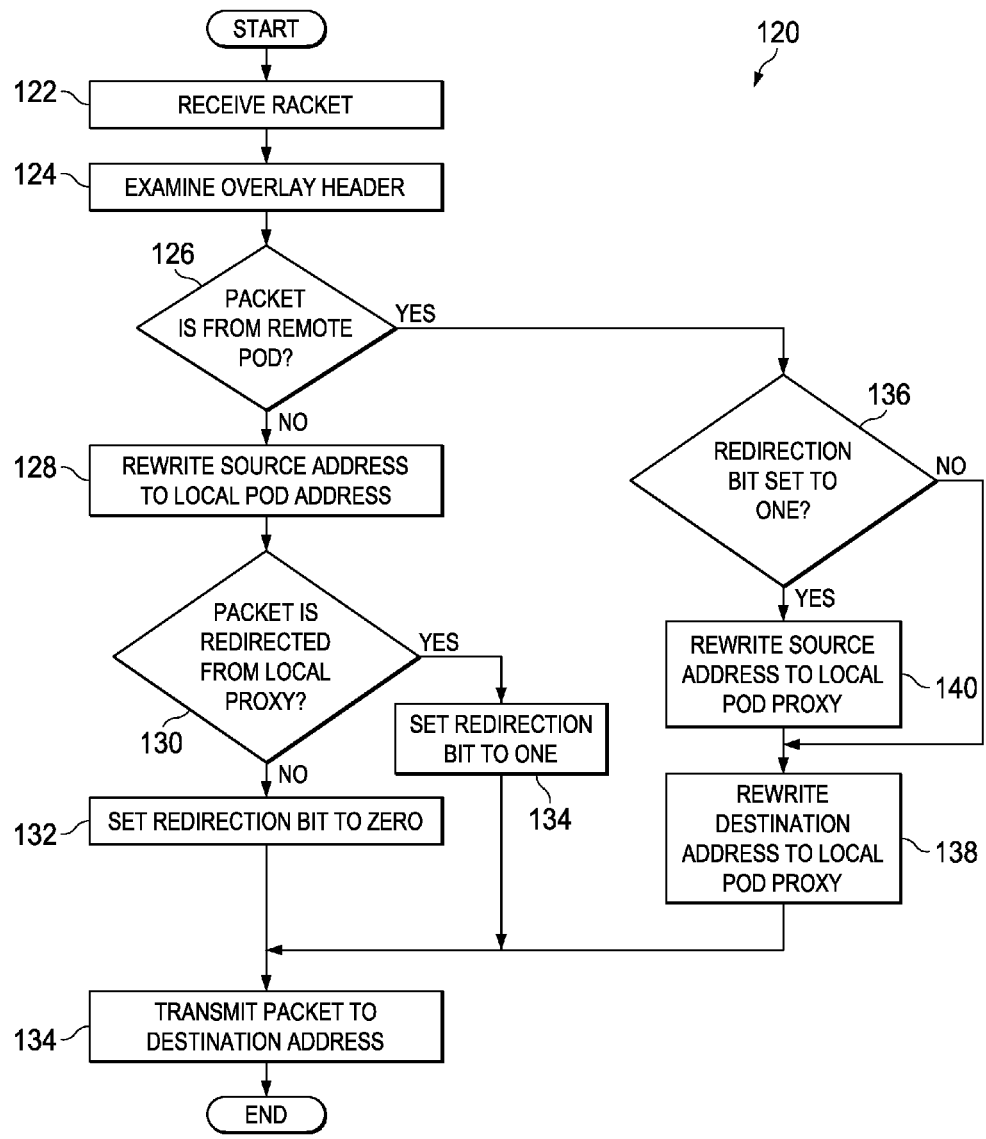
FIG. 7 is a simplified flow diagram illustrating other example operations that may be associated with an embodiment of the communication system.

Turning to FIG. 7, FIG. 7 is a simplified flow diagram illustrating example operations 120 that may be associated with translator 24 according to an embodiment of communication system 10. At 122, packet 26 may be received at translator 24. At 124, translator 24 examines overlay header 28. At 126, a determination may be made whether packet 26 is from remote pod 14 (e.g., by examining the interface it was received on: if local, packet 26 would be received at an "inside" interface; otherwise, packet 26 would be received on an "outside" interface). If packet 26 is from local pod 14 (i.e., not from remote pod 14), and therefore an outgoing packet, at 128, translator 24 rewrites source address to local pod address. At 130, a determination may be made whether packet 26 is redirected from local proxy module 46. The determination may include examining the source IP address and destination IP address and concluding redirection if both source and destination in overlay header 28 correspond to remote pods. If packet 26 is not redirected, at 132, redirection bit 31 in overlay header 28 is cleared (e.g., value of zero), and at 134, packet 26 is transmitted to the destination address indicated in overlay header 28.

Turning back to 126, if packet 26 is from remote pod 14 (e.g., packet 26 is an incoming packet), at 136, a determination may be made if redirection bit 31 in overlay header 28 is set (e.g., value of one). If not, at 138, translator 24 may rewrite the destination address to the local proxy address and transmit packet 26 to the destination address at 134. On the other hand, if redirection bit 31 is set, at 140, translator 24 rewrites the source address to local pod proxy address. Further at 138, translator 24 rewrites the destination address also to the local proxy address and transmits packet 26 to the destination address at 134. Turning back to 130, of packet 26 is redirected from the local proxy module (e.g., with source and destination addresses indicating remote pods), at 142, redirection bit 31 is set (e.g., value of one) and packet 26 is transmitted to the destination address.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, proxy module 46. In some embodiments, one or more of these features may be implemented in hardware, for example, translator 24, provided external to these elements, or consolidated in any appropriate manner to achieve the intended functionality. The various network elements in pod 14 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, translator 24 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 40, 50) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 38, 48) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a hardware translator in a multi-pod network environment, comprising:
  receiving, at the translator located in a first pod, a packet from a second pod, wherein the packet comprises an overlay header having a destination address indicating the first pod, a source address indicating the second pod and a redirection bit indicating the packet as not redirected, wherein the packet comprises an underlay header indicating a destination endpoint;
  rewriting the destination address in the overlay header to a local address of a proxy module in the first pod;
  transmitting the packet to the proxy module, wherein the proxy module examines the underlay header and determines that the destination endpoint has moved to a third pod, wherein the proxy module rewrites the destination address in the overlay header to indicate the third pod and returns the packet to the translator;
  receiving, at the translator, the packet from the proxy module, wherein the packet is outgoing from the first pod;
  identifying the packet, by the translator, as redirected based on the source address in the overlay header indicating the second pod and the destination address in the overlay header indicating the third pod, the first pod being distinct from the second pod and the third pod;
  rewriting, by the translator, the source address in the overlay header to indicate the first pod;
  setting, by the translator, a redirection bit in the overlay header tagging the packet as redirected; and
  transmitting the packet, by the translator, to the third pod.

2. The method of claim 1, further comprising:
  receiving a second packet incoming into the first pod from the second pod, wherein the second pod packet comprises a second overlay header having a destination address indicating the first pod, a source address indicating the second pod, and a redirection bit indicating the packet as redirected;
  identifying the second packet as redirected based on a value of the redirection bit in the second overlay header;
  rewriting the source address and the destination address in the second overlay header to a local address of the proxy module in the first pod;
  stripping the redirection bit from the overlay header; and
  transmitting the second packet to the proxy module in the first pod.

3. The method of claim 2, wherein a destination switch flushes a data path of the second packet and does not learn the source address in the second overlay header based on the source address and the destination address in the second overlay header indicating the local address of the proxy module.

4. The method of claim 3, wherein the destination switch determines a corrected source address by a lookup of a local endpoint repository.

5. The method of claim 1, further comprising:
  receiving, at the translator from the proxy module, a second packet outgoing from the first pod, wherein the second packet comprises a second overlay header having a destination address indicating the third pod and a source address indicating the local address of the proxy module;
  identifying the second packet as not redirected based on a source address in the second overlay header indicating a local address in the first pod and the destination address in the second overlay header indicating the third pod;
  clearing the redirection bit indicating that the packet is not redirected; and
  transmitting the packet to the third pod.

6. The method of claim 1, further comprising:
  receiving a second packet incoming into the first pod from the second pod, wherein the second packet comprises a second overlay header having a destination address indicating the first pod, a source address indicating the second pod, and a redirection bit indicating the packet as not redirected;

identifying the second packet as not redirected based on a value of the redirection bit in the second overlay header;

rewriting the destination address in the second overlay header to a local address of the proxy module in the first pod;

stripping the redirection bit from the overlay header; and transmitting the second packet to the proxy module in the first pod.

7. The method of claim 6, wherein the redirection bit is cleared to zero to tag the packet as not redirected.

8. The method of claim 1, wherein the redirection bit is set to one to tag the packet as redirected.

9. The method of claim 1, wherein each pod comprises a fabric including a plurality of spine switches interconnected to leaf switches, wherein the leaf switches are connected to endpoints that generate or terminate packets in a data plane.

10. Non-transitory tangible media that includes instructions for execution by a processor of a translator in a multi-pod network environment to perform operations comprising:

receiving, at the translator located in a first pod, a packet from a second pod, wherein the packet comprises an overlay header having a destination address indicating the first pod, a source address indicating the second pod and a redirection bit indicating the packet as not redirected, wherein the packet comprises an underlay header indicating a destination endpoint;

rewriting the destination address in the overlay header to a local address of a proxy module in the first pod;

stripping the redirection bit from the overlay header;

transmitting the packet to the proxy module, wherein the proxy module examines the underlay header and determines that the destination endpoint has moved to a third pod, wherein the proxy module rewrites the destination address in the overlay header to indicate the third pod and returns the packet to the translator;

receiving, at the translator, the packet from the proxy module, wherein the packet is outgoing from the first pod;

identifying the packet, by the translator, as redirected based on the source address in the overlay header indicating the second pod and the destination address in the overlay header indicating the third pod, the first pod being distinct from the second pod and third pod;

rewriting, by the translator, the source address in the overlay header to indicate the first pod;

setting, by the translator, a redirection bit in the overlay header tagging the packet as redirected; and transmitting the packet, by the translator, to the third pod.

11. The media of claim 10, wherein the operations further comprise:

receiving a second packet incoming into the first pod from the second pod, wherein the second packet comprises a second overlay header having a destination address indicating the first pod, a source address indicating the second pod, and a redirection bit indicating the packet as redirected;

identifying the second packet as redirected based on a value of the redirection bit in the second overlay header;

rewriting the source address and the destination address in the second overlay header to a local address in the first pod;

stripping the redirection bit from the overlay header; and transmitting the second packet to the local address in the first pod.

12. The media of claim 11, wherein a destination switch flushes a data path of the second packet and does not learn the source address in the second overlay header based on the source address and the destination address in the second overlay header indicating the local address of the proxy module.

13. The media of claim 10, wherein the operations further comprise:

receiving, at the translator from the proxy module, a second packet outgoing from the first pod, wherein the second packet comprises a second overlay header having a destination address indicating the third pod and a source address indicating the local address of the proxy module;

identifying the second packet as not redirected based on a source address in the second overlay header indicating a local address in the first pod and the destination address in the third overlay header indicating the third pod;

clearing the redirection bit indicating that the packet is not redirected; and transmitting the packet to the third pod.

14. The media of claim 10, wherein the operations further comprise:

receiving a second packet incoming into the first pod, wherein the wherein the second packet comprises a second overlay header having a destination address indicating the first pod, and a redirection bit indicating the packet as not redirected;

identifying the second packet as not redirected based on a value of the redirection bit in the second overlay header;

rewriting the destination address in the second overlay header to the local address of the proxy module in the first pod;

stripping the redirection bit from the overlay header; and transmitting the second packet to the local address in the first pod.

15. An apparatus in a first pod of a multi-pod network environment, comprising:

a memory element for storing data; and a processor, wherein the processor executes instructions associated with the data, wherein the processor and the memory element cooperate, such that the apparatus is configured as a translator for:

receiving a packet from a second pod, wherein the packet comprises an overlay header with a destination address indicating the first pod, a source address indicating the second pod and a redirection bit indicting the packet as not redirected, wherein the packet comprises an underlay header indicating a destination endpoint;

rewriting the destination address in the overlay header to a local address of a proxy module in the first pod;

stripping the redirection bit from the overlay header;

transmitting the packet to the proxy module, wherein the proxy module examines the underlay header and determines that the destination endpoint has moved to a third pod, wherein the proxy module rewrites the destination address in the overlay header to indicate the third pod and returns the packet to the translator;

receiving, at the translator, the packet from the proxy module, wherein the packet is outgoing from the first pod;

identifying the packet as redirected based on the source address in the overlay header indicating the second pod and the destination address in the overlay header indicating the third pod, the first pod being distinct from the second pod in the third pod;

rewriting, by the translator, the source address in the overlay header to indicate the first pod;

setting, by the translator, a redirection bit in the overlay header tagging the packet as redirected; and transmitting the packet, by the translator, to the third pod.

16. The apparatus of claim 15, further configured for:

receiving a second packet incoming into the first pod from the second pod, wherein the second packet comprises a second overlay header having a destination address indicating the first pod, a source address indicating the second pod, and a redirection bit indicating the packet as redirected;

identifying the second packet as redirected based on a value of the redirection bit in the second overlay header;

rewriting the source address and the destination address in the second overlay header to a local address of the proxy module in the first pod;

stripping the redirection bit from the overlay header; and transmitting the second packet to the local address in the first pod.

17. The apparatus of claim 16, wherein a destination switch flushes a data path of the second packet and does not learn the source address in the second overlay header based on the source address and the destination address in the second overlay header indicating the local address of the proxy module.

18. The apparatus of claim 15, further configured for:

receiving from the proxy module, a second packet outgoing from the first pod; wherein the second packet comprises a second overlay header having a destination address indicating the first pod, a source address indicating the local address of the proxy module;

identifying the second packet as not redirected based on a source address in the second overlay header indicating the local address in the first pod and the destination address in the second overlay header indicating the third pod;

clearing the redirection bit indicating that the packet is not redirected; and transmitting the packet to the third pod.

19. The apparatus of claim 15, further configured for:

receiving a second packet incoming into the first pod from the second pod, wherein the second packet comprises a second overlay header having a destination address indicating the first pod, a source address indicating the second pod, and a redirection bit indicating the packet as not redirected;

identifying the second packet as not redirected based on a value of the redirection bit in the second overlay header;

rewriting the destination address in the second overlay header to the local address of the proxy module in the first pod;

stripping the redirection bit from the overlay header; and transmitting the second packet to the local address in the first pod.

* * * * *